US007742501B2

(12) United States Patent
Williams

(10) Patent No.: US 7,742,501 B2
(45) Date of Patent: Jun. 22, 2010

(54) SYSTEM AND METHOD FOR HIGHER THROUGHPUT THROUGH A TRANSPORTATION NETWORK

(75) Inventor: Matthew Robert Williams, Kanata (CA)

(73) Assignee: IPEAK Networks Incorporated, Kanata, Ontario (CA)

( * ) Notice: Subject to any disclaimer, the term of this patent is extended or adjusted under 35 U.S.C. 154(b) by 1088 days.

(21) Appl. No.: 10/912,200

(22) Filed: Aug. 6, 2004

(65) Prior Publication Data

US 2006/0029101 A1 Feb. 9, 2006

(51) Int. Cl.
*H04J 3/24* (2006.01)
(52) U.S. Cl. ...................... 370/473; 370/401
(58) Field of Classification Search .................. 370/474, 370/464, 254, 473, 401–405, 465, 389, 216; 455/431; 714/746–755
See application file for complete search history.

(56) References Cited

U.S. PATENT DOCUMENTS

| | | | |
|---|---|---|---|
| 4,908,827 A | 3/1990 | Gates | |
| 5,600,663 A | 2/1997 | Ayanoglu et al. | |
| 5,677,918 A | 10/1997 | Tran et al. | |
| 5,857,072 A * | 1/1999 | Crowle | 709/203 |
| 6,000,053 A | 12/1999 | Levine et al. | |
| 6,012,159 A | 1/2000 | Fischer et al. | |
| 6,126,310 A | 10/2000 | Osthoff et al. | |
| 6,172,972 B1 | 1/2001 | Birdwell et al. | |
| 6,272,658 B1 | 8/2001 | Steele et al. | |
| 6,278,716 B1 | 8/2001 | Rubenstein et al. | |
| 6,336,200 B1 | 1/2002 | Wolfgang | |
| 6,421,805 B1 | 7/2002 | McAuliffe | |
| 6,445,717 B1 | 9/2002 | Gibson et al. | |
| 6,570,843 B1 | 5/2003 | Wolfgang | |

(Continued)

FOREIGN PATENT DOCUMENTS

EP 1755248 2/2007

OTHER PUBLICATIONS

Barakat, C.; Simulation-Based Study of link level Hybrid FEC/ARQ-SR for Wireless Links and Long-Lived TCP Traffic; INRIA Research Report RR-4752; Feb. 2003; 8pgs.

(Continued)

*Primary Examiner*—Hanh Nguyen
*Assistant Examiner*—Kenan Cehic
(74) *Attorney, Agent, or Firm*—Leslie A. Kinsman; Borden Ladner Gervais LLP

(57) ABSTRACT

Systems and methods for transporting data from a source network to a destination network by way of a transport network. Data transmission units (DTUs) from the source network are received at a server logically located between the source and the transport networks. These first DTUs are subdivided into second DTUs and are transmitted to the destination network by way of the transport network. Also transmitted are encoded or extra second DTUs that allow the original first DTUs to be recreated even if some of the second DTUs are lost. These encoded second DTUs may be merely copies of the second DTUs transmitted, parity second DTUs, or second DTUs which have been encoded using erasure correcting coding. At the destination network, the second DTUs are received and are used to recreate the original first DTUs. In the event an insufficient number of second DTUs are received, such that recreating the original first DTU cannot be accomplished, a re-transmission of the second DTUs is requested.

10 Claims, 4 Drawing Sheets

U.S. PATENT DOCUMENTS

| | | |
|---|---|---|
| 6,606,723 B2 | 8/2003 | Wolfgang |
| 6,609,223 B1 | 8/2003 | Wolfgang |
| 6,868,083 B2 | 3/2005 | Apostolopoulos et al. |
| 7,024,609 B2 | 4/2006 | Wolfgang et al. |
| 7,075,936 B2 * | 7/2006 | Hathaway et al. ...... 370/395.64 |
| 7,310,670 B1 * | 12/2007 | Walbeck et al. ............. 709/225 |
| 2001/0009547 A1 * | 7/2001 | Jinzaki et al. ............... 370/390 |
| 2003/0002499 A1 * | 1/2003 | Cummings et al. .......... 370/389 |
| 2004/0010736 A1 | 1/2004 | Alapuranln |
| 2006/0178143 A1 * | 8/2006 | Chang et al. ................. 455/431 |

OTHER PUBLICATIONS

European Patent Application No. 09167948.0 Search Report dated Nov. 26, 2009.

\* cited by examiner

SYSTEM AND METHOD FOR HIGHER THROUGHPUT THROUGH A TRANSPORTATION NETWORK

FIELD OF THE INVENTION

The present invention relates to communication data networks. More specifically, the present invention relates to systems and methods for increasing the throughput of data transmissions through a transport network as seen from the edge of the transport network.

BACKGROUND TO THE INVENTION

The growth in the number of businesses using an internal network for geographically remote locations has been phenomenal in the past few years. An office in Dallas can have its own internal communications network separate and distinct from the networks of its sister offices in Los Angeles and Seattle. However, given the need to share data and resources between such distinct locations, high speed and high performance backbone links between such offices are usually leased by the parent company to connect the different networks. Clearly, such backbone links are expensive to lease from their providers. However, the businesses that lease these lines are looking for, among others, good application performance across the transport network or the network that transports the data between the two end networks.

Most, if not all, transport networks are packet based networks that break up larger pieces of data into smaller packets of data which are then transmitted from a first source network to a third destination network via a second transport network. However, due to congestion and other network limitations, not all packets successfully arrive at the destination network. It is this packet loss that the end networks seek to minimize and, consequently, the expensive high performance transport networks or links are leased.

What matters to the source and end destination networks is the performance of the transport network. The transport network must, from the point of view of the applications at the end networks, ideally be perfect with no lost packets. However, it would be preferred if such performance can be had for a price lower than the usual costs of leasing high performance transport networks.

Accordingly, there is a need for systems and methods which can be used with low cost communications transport networks to provide end network applications with a high performance view of the transport network.

Currently, two approaches have been tried to address the above situation. In one approach, the end networks employ custom protocols that are not greatly affected by data loss and latency. However, this approach requires extensive retooling as most systems use well accepted protocols such as TCP/IP. Such an approach may also result in chaos as there is no guarantee that such custom protocols will be interoperable with established end and transport networks.

Another approach involves using a custom protocol stack to transfer data across the transport network and initiating new TCP/IP sessions at the destination network. However, this approach is only useful for systems which use the TCP/IP protocol and other protocols, such as UDP/IP, may be affected by the latency and/or loss across the transport network.

It should be noted that the term data transmission unit (DTU) will be used in a generic sense throughout this document to mean units wich include transmitted data. Thus, such units may take the form of packets, cells, frames, or any other such units as long as data is encapsulated within the unit. Thus, the term DTU is applicable to any and all packets and frames that implement specific protocols, standards, or transmission schemes.

SUMMARY OF THE INVENTION

The present invention provides systems and methods for transporting data from a source network to a destination network by way of a transport network. Data transmission units (DTUs) from the source network are received at a server logically located between the source and the transport networks. These first DTUs are subdivided into second DTUs and are transmitted to the destination network by way of the transport network. Also transmitted are encoded or extra second DTUs that allow the original first DTUs to be recreated even if some of the second DTUs are lost. These encoded second DTUs may be merely copies of the second DTUs transmitted, parity second DTUs, or second DTUs which have been encoded using erasure correcting coding. At the destination network, the second DTUs are received and are used to recreate the original first DTUs. In the event an insufficient number of second DTUs are received, such that recreating the original first DTU cannot be accomplished, a retransmission of the second DTUs is requested.

In a first aspect, the present invention provides a server for forwarding data from a first network to a second network, the server comprising:

a first interface module for sending data to and receiving data from said first network;

a second interface module for sending data to and receiving data from said second network;

a segmenting module for packaging each first DTU of a first type received from said first network into at least one second DTU of a second type, said segmenting module receiving first DTUs from said first interface module and said segmenting module sending said at least one second DTU and at least one extra second DTU to said second interface module for transmission to said second network;

a reassembly module for reassembling second DTUs received from said second network into first DTUs, said reassembly module determining if a sufficient number of second DTUs have been received to reassemble said first DTUs based on a number of second DTUs received and on a number of extra second DTUs received, said reassembly module sending reassembled first DTUs to said first interface module for transmission to said first network, said reassembly module receiving said second DTUs from said second network interface.

In a second aspect, the present invention provides a system for transmitting data from a first network to a third network by way of a second network, the system comprising:

a first server connecting said first network and said second network, said first server receiving first DTUs of a first type from said first network and subdividing each one of said first DTUs into second DTUs of a second type, said second DTUs and extra second DTUs being transmitted to said second network by said first server.

a second server connecting said second network and said third network, said second server receiving said second DTUs from said second network, said second server recreating said first DTUs from said second DTUs, said second server transmitting said first DTUs to said third network wherein
said second server recreates said first DTUs from said second DTUs and from said extra second DTUs in the event not all original second DTUs are received.

In a third aspect, the present invention provides a method of forwarding data transmissions from a first network to a third network, network by way of a second network, said first network producing first data transmission units (DTUs) of a first type, said first DTUs being divided into second DTUs of a second type, the method comprising:
 a) receiving from said second network second DTUs of a second type;
 b) determining if a sufficient number of second DTUs have been received to recreate a first DTU, said determining step being based how many second DTUs have been received and on a number of extra second DTUs received.
 c) in the event an insufficient number of second DTUs have been received, requesting a re-transmission of said second DTUs and executing step b);
 d) in the event a sufficient number of second DTUs have been received, recreating said first DTU; and
 e) transmitting said first DTU to said third network.

In a fourth aspect, the present invention provides a method of forwarding data transmissions from a first network to a third network via a second network, the method comprising:
 a) receiving first data transmission units (DTUs) of a first type form said first network;
 b) for each first DTU of a first type, dividing said first DTU into second DTUs of a second type;
 c) transmitting said second DTUs to said second network;
 d) transmitting at least one extra second DTU to said second network, said at least one extra second DTU being derived from said second DTUs transmitted in step c), wherein said at least one extra second DTU allows said first DTU to be recreated in the event not all second DTUs are not received at said second network, x being less than or equal to a predetermined threshold.

BRIEF DESCRIPTION OF THE DRAWINGS

A better understanding of the invention will be obtained by considering the detailed description below, with reference to the following drawings in which.

DETAILED DESCRIPTION

Figure 1:
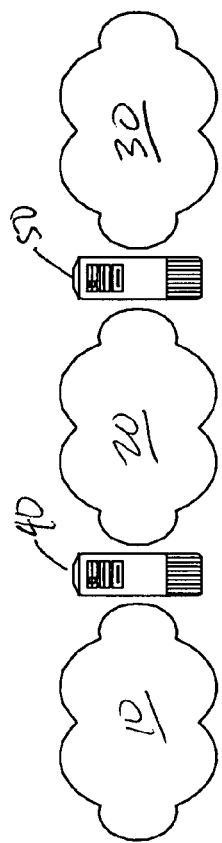
FIG. 1 is a block diagram of an environment in which the invention may be practiced.

Referring to FIG. 1, a block diagram of an environment in which the invention may be practised is illustrated. A first network 10 communicates with a second network 20 which, in turn, communicates with a third network 30. The first network 10 and the second network 20 communicate through server 40 while the second network 20 communicates with the third network 30 through server 50. Should the first network 10 wish to communicate with the third network 30 (perhaps to create a larger wide area network), then the second network 20 becomes a transport network as it merely provides a conduit between the first network 10 and the third network 30. As noted above, applications residing in the two end networks, the first network 10 and the third network 30, merely require that the transport network provide a virtually perfect conduit with no lost DTUs and, preferably, minimal latency.

The present invention seeks to provide a means for insulating the end networks from the vagaries of the transport network. The servers 40, 50 insulate the end networks 10, 30 from dealing with the transport network 20 by handling the transmission of DTUs through the transport network 20. The end networks may use any communications protocols between them and the servers 40, 50 may use its own protocol between them. The servers 40, 50 receive DTUs in one protocol from the end networks and repackages these DTUS into new DTUs prior to transmitting them through the transport network. However, instead of merely repackaging the DTUs from the end networks, the servers 40, 50 also subdivides them into preferably smaller DTUs. Also, the servers 40, 50 encodes extra DTUs which will allow the recreation/reconstruction of the original DTUs from the end networks even though some of the DTUs which were transmitted through the transport network were lost.

Once the DTUs transmitted through the transport network are received at the other end, the original DTUs from the end network are recreated. This is done by reordering the received DTUs and, if some DTUs were lost during transmission, using the extra DTUs which were transmitted as well. In the event the extra received DTUs are insufficient to recreate the original DTUs from the end network, then the receiving server may request a re-transmission of the DTUs previously sent.

For ease of explaining the above process, DTUs originating from or being transmitted to the end networks will be referred to as first DTUs and as being of a first type of DTU. DTUs being transmitted across and/or received from the transport network will be referred to as second DTUs and as being of a second type of DTU.

Figure 2:
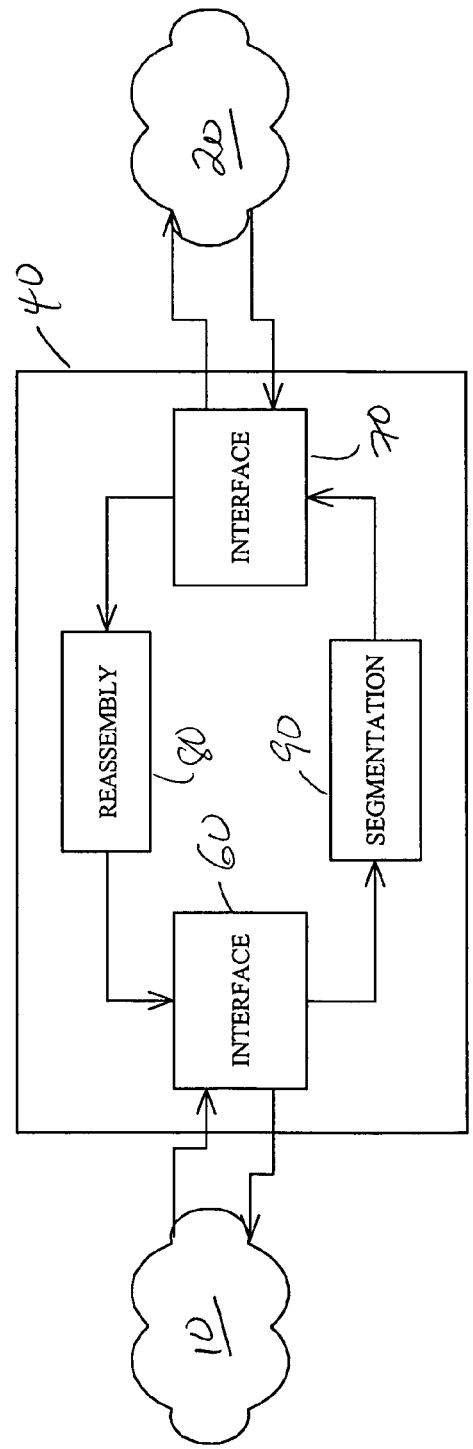
FIG. 2 is a block diagram illustrating the components in a server used in FIG. 1.

Referring to FIG. 2, a block diagram of the modules in server 40 is illustrated along with the data flow associated with the networks server 40 communicates with. As can be seen, server 40 has a first interface 60, a second interface 70, a reassembly module 80, and a segmentation module 90. The first interface 60 sends and receives first DTUs to and from an end network. In FIG. 2, the end network is illustrated as the first network 10. The second interface 70 of the server 40 sends and receives second DTUs to and from the transport network. In FIG. 2, the transport network is illustrated as being the second network 20.

Regarding the modules in the server 40, the reassembly module 80 receives second DTUs from the second interface 70 and produces first DTUs for transmission to the first network 10 by way of the first interface 60. The segmentation module 90, on the other hand, receives first DTUs from the first interface 60 and produces second DTUs for transmission to the transport network 20 by way of the second interface 70.

Figure 3:
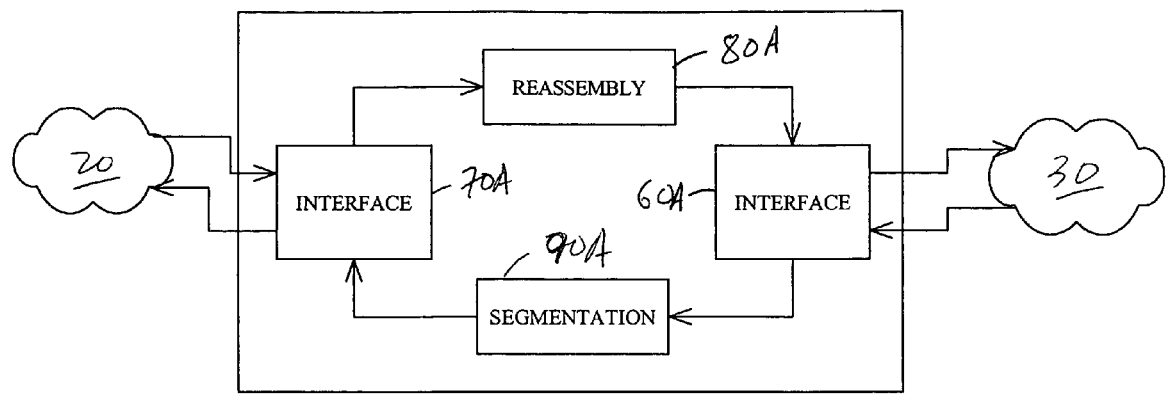
FIG. 3 is a block diagram illustrating the components in another server used in FIG. 1.

Once the second DTUs have been transmitted through the transport network, they are received by the server at the other end. To illustrate this, FIG. 3 illustrates the modules and data flow through the server 50 which communicates with the transport network and the other end network. In FIG. 3, the transport network is illustrated as the second network 20 and the third network 30 is illustrated as the end network.

The modules in the server 50 are the same as those in server 40 and, in fact, have the same functions. The second interface 70A in server 50 also communicates with the transport network and sends and receives second DTUs. The first interface 60A also communicates with an end network (in this case the third network 30) and sends and receives first DTUs. The reassembly module 80A receives second DTUs and produces first DTUs while the segmentation module 90A receives first DTUs and produces second DTUs.

As noted above, first DTUs are the DTUs used by the end networks while second DTUs are used by the transport network and the servers 40, 50 when transmitting data to and from each other. The second DTUs are derived from the first DTUs. The first DTUs may be divided into smaller units and each smaller unit may be the payload in a second DTU. As such, it is quite possible that each second DTU may be smaller than the original first DTU from which it was derived. As an example, a 10 kb first DTU may be subdivided into 5 2 kb units. These may be the payload of 5 second DTUs, each of which may be smaller than 10 kb. This function of creating second DTUs from first DTUs is accomplished by the segmentation modules 90, 90A.

Once the second DTUs are created by the segmentation module 90, 90A, to assist in recreating the original first DTU from which the second DTUs were derived from, the segmentation module also creates extra or encoded second DTUs. These extra second DTUs are derived from the second DTUs derived from the first DTU. The concept behind the extra second DTUs is to assist the reassembly modules 80, 80A in recreating or reassembling the original first DTU in the event one or more second DTUs are lost during their transmission through the transport network.

The extra second DTUs may take many forms. In perhaps the simplest embodiment, the extra second DTUs are merely copies of selected second DTUs previously sent. As an example, if a first DTU was divided into 4 second DTUS (DTU1, DTU2, DTU3, and DTU4), then the extra second DTUs may be copies of DTU2 and DTU3. As such, if DTU 2 or DTU3 were lost during the transmission, then the original first DTU can still be recreated. Whichever of the second DTUs are to be duplicated and how many extra second DTUs are to used are left to the discretion of the system administrator or to the setup of the system. Depending on how lossy the transport network may be, more or less redundancy may be built in by including more or less duplicate second DTUs. In the simplest case, all the second DTUs can be duplicated to ensure that, in essence, two copies of each second DTU is sent to the destination server.

Another type of extra second DTU would be parity DTUs. As is well known in the art, a parity DTU can be created using the XOR function. The bits of the different second DTUs created from the original first DTU can be XOR'd to result in bit values which can be stored in an extra second DTU. If any one of the second DTUs (not including the extra second DTU) is lost during transmission, the other received second DTU and the extra second DTU can be used to recreate the lost second DTU. Performing an XOR function on the received second DTUs and the extra second DTU will recreate the missing second DTU.

It should be noted that the extra second DTUs may be encoded using other erasure correcting codes. As an example, if n second DTUs are generated for a single first DTU, m extra second DTUs may be generated to allow the lost second DTUs to be recreated. As noted above, the m extra second DTUs may be viewed as "redundant" second DTUs and, if mere duplication is used, $m \leq n$ with complete duplication being achieved at $m=n$. However, if erasure correcting codes are used, with $n>2$ and $m=2$, it is possible to encode the redundant information in such a way that two second DTUs could be lost and the reassembly modules can still reconstruct the lost second DTUs. Well-known methods and coding techniques such as Reed-Solomon, Forward Erasure Correction techniques, and Bose-Chaudhuri-Hochquenghem (BCH) codes, and a multitude of others may be used.

While the extra second DTUs should assist in counteracting the effects of losing some second DTUs, losing too many second DTUs cannot be completely compensated for. As such, losing a number of second DTUs past a preset and predetermined threshold level should cause the reassembly modules to request a re-transmission of a package or group of second DTUs. As an example, if the extra second DTUs can recover from a 25% loss of DTUs and there are 4 second DTUs generated from a single first DTU, then the loss of a single second DTU will not trigger a re-transmission request. However, with the loss of 2 second DTUs, a 50% loss, the reassembly module should request a re-transmission. The preset and predetermined threshold is ideally related to the error or loss correcting capability of the coding used for the extra or redundant second DTUs. The reassembly modules can keep track of the number of second DTUs received for each first DTU that has been segmented as the reassembly modules will need to properly sequence the payloads of the second DTUs.

As can be noted from the above, the reassembly modules will need to decode, unwrap, and reassemble the second DTUs received. The second DTUs received will need to be tracked to determined if there is a sufficient number of them to be compensated for by the extra second DTUs or if a retransmission is to be requested. If there is a sufficient number and if some second DTUs have been lost, then the reassembly modules will need to recreate or reconstruct the missing second DTUs or, if not the actual lost second DTUs, the contents of those missing second DTUs will need to be reconstructed. As noted above, this process depends upon the coding used and the overall strategy employed. This decoding and error correction process is well-known to those versed in this art.

Once the required number of second DTUs have been received, their payloads are extracted and used to reconstruct the original first DTU from which was derived the second DTUs. This may be as simple as concatenating the payloads of the second DTUs to result in the reconstructed first DTU. However, as noted above regarding the decoding, the reconstruction process will depend upon the process used to segment or divide the original first DTU. With the original first DTU reconstructed, it can be forwarded to the interface module that communicates with the end network.

Regarding the segmentation modules, these modules perform the task of segmenting or dividing the first DTUs and "repackaging" the segments into second DTUs. The segmentation modules also encode the extra second DTUs as discussed above. The second DTUs, both those derived from the first DTU and the encoded extra second DTUs, are then passed on to the interface module that communicates with the transport network. To facilitate the re-transmission of the second DTUs in the event the reassembly module of the other end of the transport network requests it, the segmentation module should, preferably, buffer the last few second DTUs transmitted. As an example, if 5 first DTUs have been segmented into 20 second DTUs and 5 extra second DTUs, the segmentation module may buffer the last 3 sets of second DTUs corresponding to the last 3 first DTUs encoded. Thus, 12 second DTUs and 3 extra second DTUs can be buffered by the segmentation module.

To spread the risk of losing multiple second DTUs across different segmented first DTUs, the segmentation module may be configured to transmit second DTUs in an interleaved manner. Thus, instead of sequentially sending groups of second DTUs such that each group corresponds to a single first DTU, second DTUs from different first DTUs can be interleaved with one another. To illustrate the point, it can be assumed that first DTUs A, B, and C are respectively segmented into second DTUs DTU-A1, DTU-A2, DTU-A3, DTU-B1, DTU-B2, DTU-B3, DTU-C1, DTU-C2, and DTU-C3. Instead of sending these second DTUs as being grouped according to which first DTU they were derived from (i.e. group A is DTU-A1, DTU-A2, DTU-A3, and group B is DTU-B1, DTU-B2, DTU-B3, and so on), they can be interleaved. If second DTUs are send in groups of 3 DTUs, then the first group can be DTU-A1, DTU-B1, and DTU-C1. Another group can be DTU-A2, DTU-B2, and DTU-C2, and so on. Using this scheme, if a group is lost, then a whole first DTU is not lost—only one third of the 3 first DTUs is lost. Depending on the coding and strategy employed, this type of loss may be recoverable.

Figure 4:
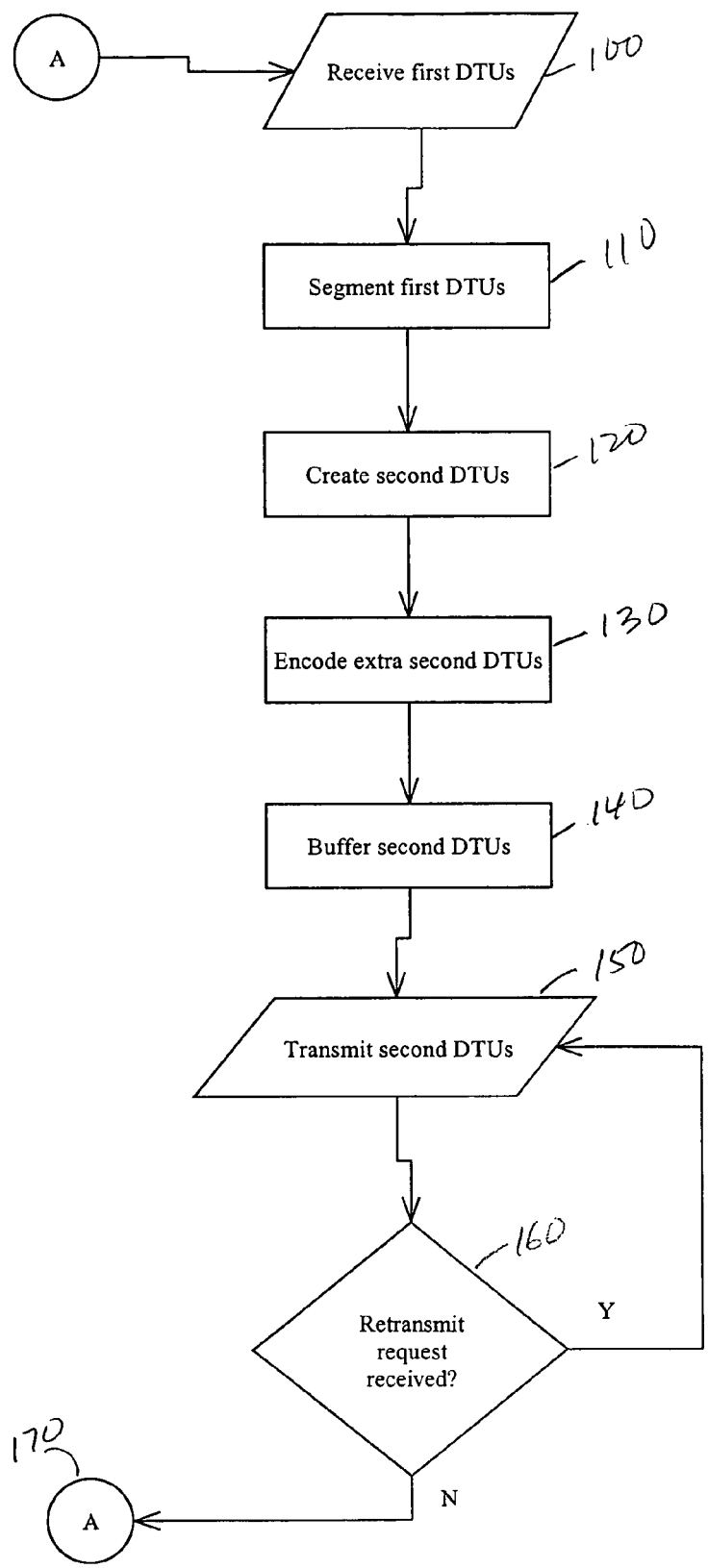
FIG. 4 is a flowchart illustrating the steps executed when first DTUs are received and transformed into second DTUs for transmission to the transport network.

For a server transmitting second DTUs across the transport network, the steps in the process it executes are illustrated in FIG. 4. The process begins with step 100, that of receiving a first DTU from the source end network. After being received, the first DTU is then divided or segmented (step 110) and the segments are packaged into second DTUs (step 120). Once the second DTUs are created, the extra or redundant second DTUs are encoded and created (step 130). The second DTUs are then buffered (step 140) and then transmitted to the transport network (step 150). Decision 160 then determines if a re-transmission request has been received. IF such a request is received, then the decision flow returns to step 150, that of transmitting the second DTUs. If no request is received within a set period of time, the connector 170 returns the control flow to step 100.

Figure 5:
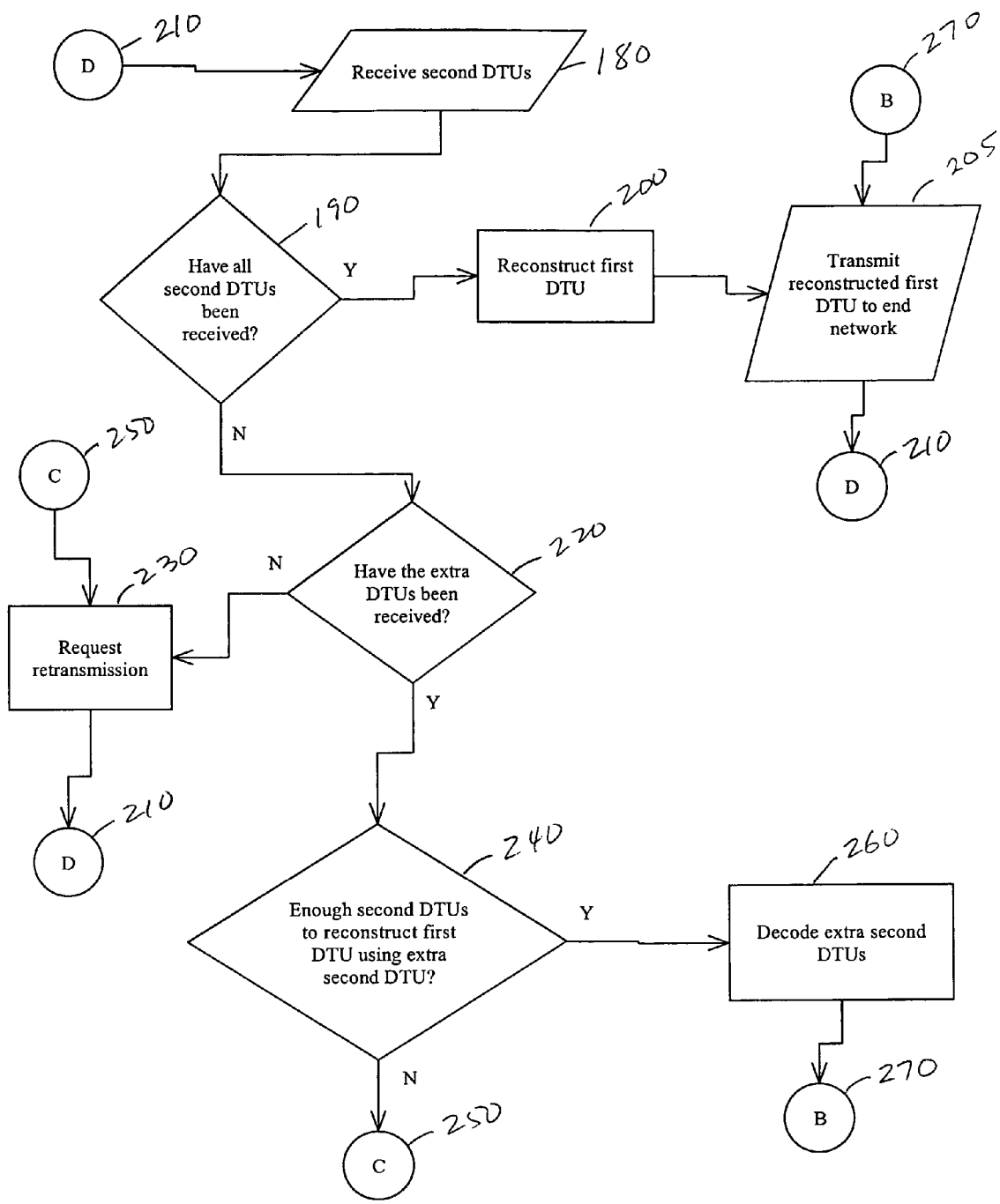
FIG. 5 is a flowchart illustrating the steps executed when second DTUs are received from the transport network and transformed into first DTUs for transmission to an end network.

Referring to FIG. 5, an illustration of the steps executed by a server receiving second DTUs from the transport network is presented. The process begins at step 180 as the server receives second DTUs from the transport network. Decision 190 then determines if all the second DTUs have been received to reconstruct the first DTU from which the second DTUs were received. IF they have been received, then step 200 is that of recreating the original first DTU. Once the first DTU have been recreated, the recreated DTU is transmitted to the destination end network (step 205) and the control flow moves back to step 180 by way of connector 210.

Returning to decision 190, if not all the second DTUs have been received, then decision 220 determines if the extra second DTUs have been received. IF the extra second DTUs have been lost as well, then a re-transmission is requested (step 230). After the re-transmission request, the control flow returns to step 180 by way of connector 210. In the event the extra second DTUs have been received, decision 240 determines if sufficient extra second DTUs and second DTUs have been received to reconstruct the original first DTU. IF an insufficient amount has been received, then connector 250 moves the control flow to step 230, that of requesting a re-transmission. If a sufficient amount has been receive, then step 260 is that of decoding the extra second DTUs to recreate or reconstruct the missing second DTUs. Connector 270 then returns the control flow to step 200, that of recreating the first DTU from the received second DTUs.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A server for forwarding data from a first network to a second network, the server comprising:
    a first interface module for sending data to and receiving data from said first network;
    a second interface module for sending data to and receiving data from said second network;
    a segmenting module segmenting each first data transmission unit (DTU) of a first type received from said first network into at least two second DTUs of a second type, said segmenting module receiving first DTUs from said first interface module and said segmenting module sending said at least two second DTUs and at least one duplicate second DTU to said second interface module for transmission to said second network;
    a reassembly module reassembling first DTUs from second DTUs and duplicate second DTUs received from said second network, said reassembly module determining if a predetermined total number of second DTUs and duplicate second DTUs have been received to reassemble a first DTU, said reassembly module sending reassembled first DTUs to said first interface module for transmission to said first network, said reassembly module receiving said second DTUs and duplicate second DTUs from said second network interface, and, in the event the predetermined total number of second DTUs and duplicate second DTUs is not received by said reassembly module, said reassembly module transmits a retransmit request to a sender server by way of said second interface module.

2. A server according to claim 1 wherein in the event said segmenting module receives the retransmit request from the reassembly module, said segmenting module retransmits a requested group of second DTUs by way of said second interface module.

3. A server according to claim 1 wherein said segmenting module interleaves second DTUs from different first DTUs when sending the interleaved second DTUs to said second interface module.

4. A server according to claim 2 wherein said segmenting module buffers second DTUs sent to said second interface module.

5. A server according to claim 1 wherein said segmenting module divides each first DTU into n second DTUs and for each first DTU, sends m duplicate second DTUs to said second interface module, and m$\leq$n.

6. A system for transmitting data from a first network to a third network by way of a second network, the system comprising:
   a first server connecting said first network and said second network, said first server receiving first DTUs of a first type from said first network and subdividing each one of said first DTUs into second DTUs of a second type, said second DTUs and at least one duplicate second DTU being transmitted to said second network by said first server;
   a second server connecting said second network and said third network, said second server receiving said second DTUs and said at least one duplicate second DTU from said second network, and on determining that sufficient a predetermined total number of second DTUs and duplicate second DTUs have been received, said second server recreating said first DTUs from said second DTUs and said duplicate second DTUs, said second server requesting a retransmission of said second DTUs from said first server in the event the predetermined total number of second DTUs and duplicate second DTUs are determined not to have been received, and said second server transmitting said recreated first DTUs to said third network.

7. A method of forwarding data transmissions from a first network to a third network by way of a second network, said first network producing a first data transmission unit (DTU) of a first type, said first DTU being segmented into second DTUs of a second type, the method comprising:
   a) receiving from said second network second DTUs and at least one duplicate second DTU;
   b) determining if a predetermined total number of second DTUs and duplicate second DTUs have been received to recreate a first DTU, said determining step being based on how many second DTUs and duplicate second DTUs have been received;
   c) in the event the predetermined total number of second DTUs and duplicate second DTUs have not been received, requesting a re-transmission of said second DTUs and duplicate second DTUs and re-executing step b);
   d) in the event the predetermined total number of second DTUs and duplicate second DTUs have been received, recreating said first DTU; and
   e) transmitting said recreated first DTU to said third network.

8. A method according to claim 7 wherein said second DTUs and duplicate second DTUs received from said second network are interleaved with second DTUs and duplicate second DTUs from different first DTUs.

9. A method of forwarding data transmissions from a first network to a third network via a second network, the method comprising:
   a) receiving first data transmission units (DTUs) of a first type from said first network;
   b) for each first DTU of a first type, segmenting said first DTU into second DTUs of a second type;
   c) transmitting said second DTUs to said second network;
   d) transmitting at least one duplicate second DTU to said second network, wherein said at least one duplicate second DTU allows said first DTU to be recreated in the event not all second DTUs are received at said second network; and
   e) in the event a predetermined total number of second DTUs and duplicate second DTUs have not been received to recreate said first DTU, requesting a re-transmission of said second DTUs and said at least one duplicate DTU.

10. A method according to claim 9 further including the step of interleaving second DTUs and duplicate second DTUs from different first DTUs prior to transmitting the interleaved second DTUs and the interleaved duplicate second DTUs.

* * * * *